United States Patent
Izumi et al.

(10) Patent No.: US 8,207,694 B2
(45) Date of Patent: Jun. 26, 2012

(54) MOTOR CONTROLLER

(75) Inventors: Shiho Izumi, Hitachinaka (JP); Satoru Kaneko, Naka (JP); Hideki Nihei, Hitachiota (JP)

(73) Assignee: Hitachi, Ltd., Tokyo (JP)

( * ) Notice: Subject to any disclaimer, the term of this patent is extended or adjusted under 35 U.S.C. 154(b) by 305 days.

(21) Appl. No.: 12/543,750

(22) Filed: Aug. 19, 2009

(65) Prior Publication Data
US 2010/0052581 A1 Mar. 4, 2010

(30) Foreign Application Priority Data
Aug. 27, 2008 (JP) ................... 2008-217498

(51) Int. Cl.
*H02P 6/16* (2006.01)
(52) U.S. Cl. ......... 318/400.04; 318/400.01; 318/400.07; 318/400.15; 318/400.23; 318/700
(58) Field of Classification Search ............. 318/400.04, 318/400.01, 400.07, 400.15, 400.23, 700
See application file for complete search history.

(56) References Cited

U.S. PATENT DOCUMENTS

| 5,600,215 | A  | * | 2/1997  | Yamada et al.  | 318/139 |
| 7,180,263 | B2 | * | 2/2007  | Maeda et al.   | 318/719 |
| 7,271,557 | B2 | * | 9/2007  | Ajima et al.   | 318/400.01 |
| 7,294,988 | B2 | * | 11/2007 | Ajima et al.   | 318/712 |
| 7,330,014 | B2 | * | 2/2008  | Obayashi       | 322/24 |
| 7,388,341 | B2 | * | 6/2008  | Tobari et al.  | 318/400.07 |

FOREIGN PATENT DOCUMENTS

| JP | 2001-211698 | 8/2001 |
| JP | 2007-236016 | 9/2007 |

\* cited by examiner

*Primary Examiner* — Walter Benson
*Assistant Examiner* — David Luo
(74) *Attorney, Agent, or Firm* — Antonelli, Terry, Stout & Kraus, LLP.

(57) ABSTRACT

When the torque command value is zero, a set point of DC current for an inverter is calculated to obtain a difference between the set point and a detected DC current so that an error in magnetic pole position may be estimated and corrected. By correcting the magnetic pole position, unwanted power running and regenerative torque of the motor can be avoided and unnecessary charge or discharge to or from a battery can be prevented.

8 Claims, 8 Drawing Sheets

MOTOR CONTROLLER

BACKGROUND OF THE INVENTION

The present invention relates to motor controllers and more particularly to a method of controlling a rotary machine used in a hybrid vehicle and a controller therefor.

In the hybrid vehicle or an electro-mobile using a motor in the drive system of a vehicle, for the sake of controlling the torque or revolution speed of the motor (for example, a DC brushless motor), the phase of voltage applied to an armature needs to be controlled in accordance with the position of a magnetic pole of a rotor. Accordingly, in this type of motor (DC brushless motor), a magnetic pole position sensor for detection of the rotor's magnetic position is provided so that the phase of the voltage applied to the armature may be manipulated in accordance with a magnetic pole position detected by the magnetic pole position sensor. The magnetic pole position sensor as above is constructed of a resolver, an encoder and a Hall device. In controlling an AC motor provided with the magnetic pole position sensor, an error will often develops between a detected magnetic pole position and an actual magnetic pole position owing to positioning during assemblage of the magnetic pole position sensor, aging deterioration and detection accuracy of the magnetic pole position sensor per se as well. When the phase of voltage is manipulated using the detected magnetic pole position in the presence of the error as above, the motor will suffer degradations in power factor and efficiency. In addition, even if the torque command value to the motor is zero, a current will flow, so that unnecessary power running and regenerative torque are sometimes generated and the battery undergoes unwanted charge or discharge.

In an invention for correction of the phase error in the magnetic pole position sensor as disclosed in a related art JP-A-2001-211698, the magnetic pole position is estimated on the basis of a signal for synchronization of motor current with PWM signal in order to correct the revolution sensor for its position error. In the related art, a differential value of motor current during three-phase short-circuit is calculated to determine an estimated value of magnetic pole position.

SUMMARY OF THE INVENTION

In the aforementioned related art, the phase detection can be realized through relatively simple calculation by using only information inside the motor controller but because of calculation of a differential value of motor current during three-phase short-circuit, a larger number of A/D conversion operations than usual are needed, making the process sophisticated.

Accordingly, the present invention contemplates solving the aforementioned problem encountered in the conventional position estimation based on the calculation inside the motor controller and has for its object to provide a motor controller capable of preventing, in the presence of an error in magnetic pole position, the generation of unwanted power running and regenerative torque and the charge or discharge to or from the battery as well.

Another object of the present invention is to provide a motor controller which detects, when an error develops in magnetic pole position, the error to perform fault diagnosis.

To accomplish the above object in a motor controller comprising an AC motor, a revolution sensor for detecting a magnetic pole position of the AC motor, an inverter for driving the AC motor and control means for controlling the inverter in accordance with a requested torque, magnetic pole position correction means is provided which corrects by using DC current of the inverter a magnetic pole position of the motor detected by means of the revolution sensor.

Also, in the motor controller, the magnetic pole position correction means includes DC current set point calculation means for calculating a set point of DC current for the inverter when the torque command value to the motor is zero and estimates an error in magnetic pole position of the motor by comparing the detected inverter DC current with the set point calculated by the DC current set point calculation means, thus correcting the magnetic pole position.

Then, in the motor controller, the DC current set point calculation means calculates the set point of DC current when the torque command value applied to the motor is zero by using a current command value to the motor.

Also, to accomplish the aforementioned object, in a motor controller having an AC motor, a revolution sensor for detecting the magnetic pole position of the AC motor, an inverter for driving the AC motor, a battery for supplying power to the inverter and control means for controlling the inverter in accordance with a requested torque, the presence/absence of an error in the magnetic pole position of the motor is decided by detecting a variation in voltage of the battery when the torque command value to the motor is zero.

Then, in the motor controller, DC current set point calculation means is provided which calculates a set point of DC current for the inverter when the torque command value applied to the motor is zero and estimates an error in magnetic pole position of the motor by comparing the detected inverter DC current with the set point calculated by the DC current set point calculation means, thus correcting the magnetic pole position.

Besides, in the motor controller, the DC current set point calculation means calculates the set point of DC current when the torque command value to the motor is zero by using a current command value to the motor.

Also, to accomplish another object as above, in a motor controller having an AC motor, a revolution sensor for detecting the magnetic pole position of the AC motor, an inverter for driving the AC motor, a battery for inputting/outputting power to/from the inverter and control means for controlling the inverter, position error estimation means is provided which estimates an error in magnetic pole position of the motor by detecting a variation in power of the battery when the torque command value to the motor assumes a predetermined value, so that a faulty state is decided from the error estimated by the position error estimation means.

Then, in the motor controller, DC current set point calculation means is provided which calculates a set point of DC current for the inverter when the torque command value to the motor is zero and the position error estimation means estimates an error in magnetic pole position of the motor by comparing the detected battery DC current with the set point calculated by the DC current set point calculation means.

Besides, in the motor controller, the DC current set point calculation means calculates the set point of DC current by using a command value to the motor when the torque command value to the motor is zero.

According to the present invention, when an error develops in a magnetic pole position detected by the motor revolution sensor, the positional error can be corrected, thereby realizing elimination of unwanted torque generation and reduction of unwanted charge or discharge to or from the battery.

Other objects, features and advantages of the invention will become apparent from the following description of the embodiments of the invention taken in conjunction with the accompanying drawings.

DESCRIPTION OF THE EMBODIMENTS

A first embodiment of this invention will now be described with reference to FIGS. 1 to 8.

Figure 2:
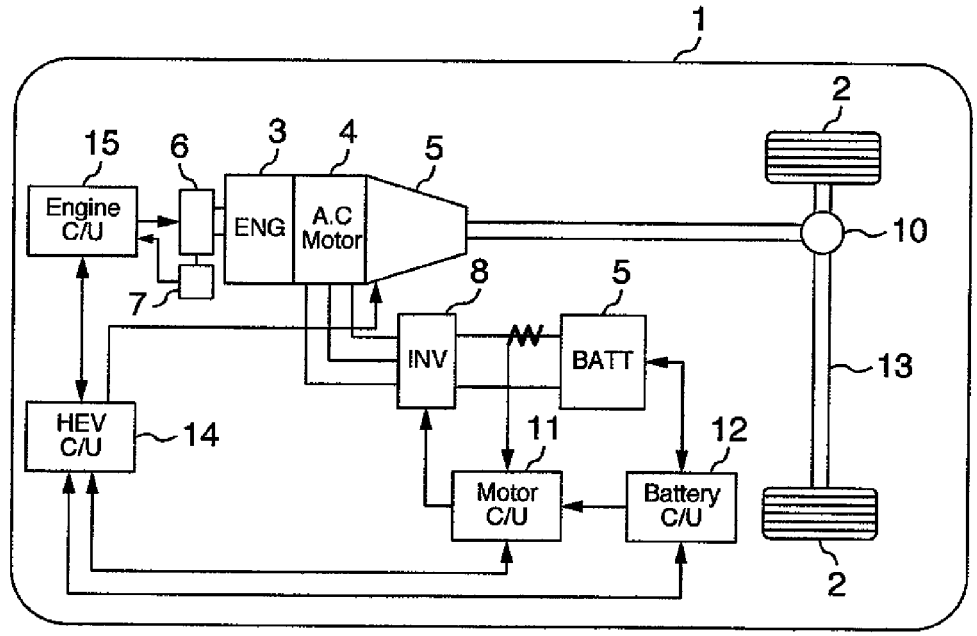
FIG. 2 is a diagram showing the construction of a hybrid vehicle using an AC motor.

Firstly, reference will be made to FIG. 2 to describe the construction of a hybrid vehicle carrying a controller for a rotary machine and using an AC motor.

Figure 1:
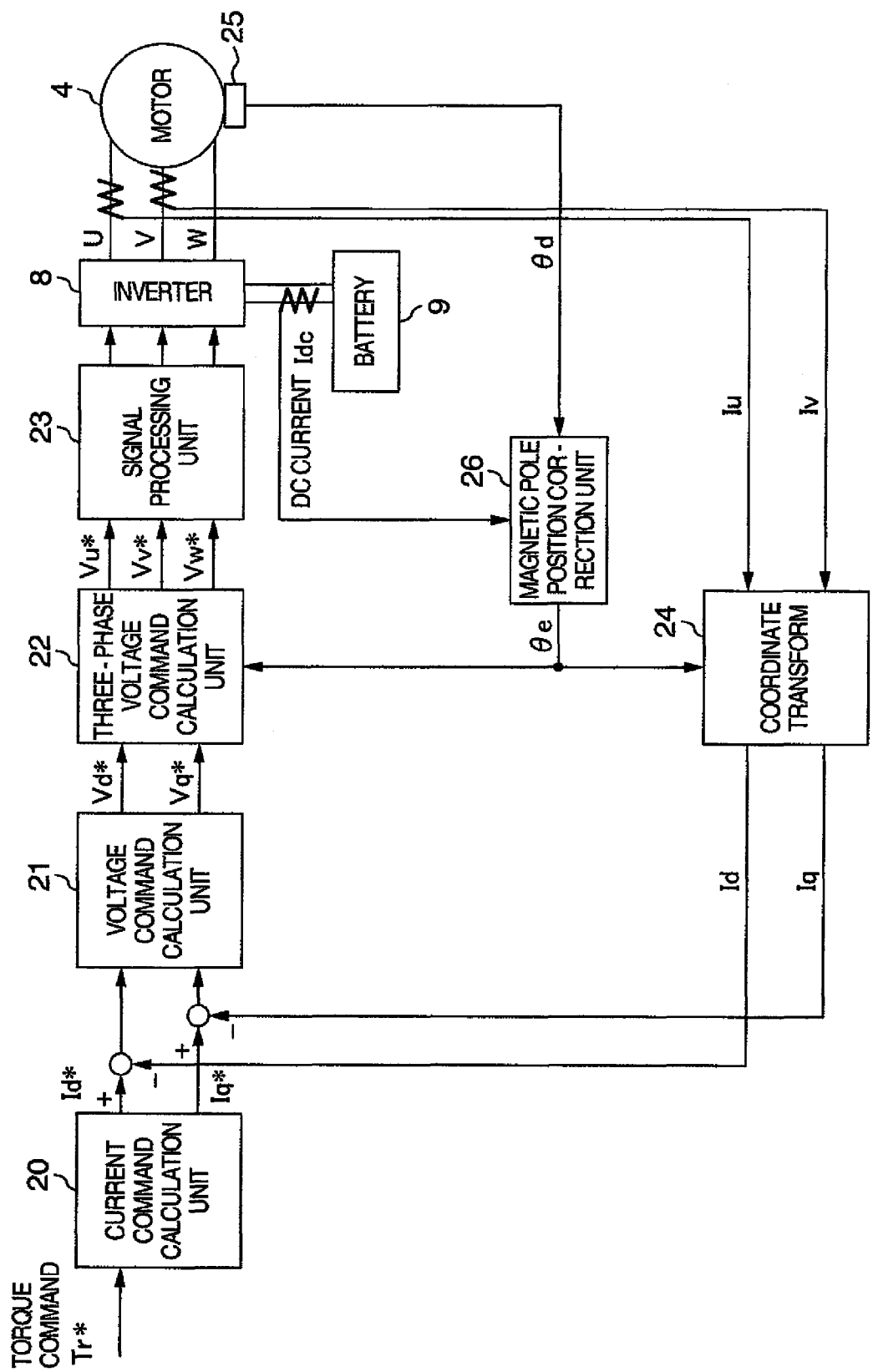
FIG. 1 is a block diagram showing the motor control inside a motor controller according to a first embodiment of the invention.

The hybrid vehicle, as generally designated by reference numeral 1, comprises an engine 3 and an AC motor 4. Drive force by the engine 3 is transmitted to front wheels 2 via a transmission 5 and an axle 13, driving the front wheels 2. The output of the engine 3 is controlled with an electronic control throttle 6 driven by commands from an engine control unit 15. The electronic control throttle 6 is provided with an accelerator opening sensor 7 so as to detect an accelerator opening. The output of the engine 3 not only drives the front wheels 2 but also drives sometimes the AC motor 4. Drive force by the AC motor 4 is transmitted to the driving wheels 2 via a differential gear 10 and the axle 13, driving the driving wheels 2. Exemplified in FIG. 1 is the configuration where the AC motor 4 is directly connected but a configuration may be adopted in which the AC motor is connected through the medium of a switch mechanism such as a clutch.

The AC motor is a motor/generator. When the AC motor 4 operates as a motor, it outputs driving force. Conversely, the AC motor 4 can be driven with the help of the engine 3 or driving wheels 2, thus operating as a generator to output AC power.

An inverter 8 is adapted to desirably control the AC motor 4 to cause it to deliver necessary power. The inverter 8 converts DC power accumulated in a battery 9 into AC power which in turn is fed to the AC motor 4. During regenerative braking or electric power generation, AC power the AC motor 4 outputs is converted with the inverter 8 into DC power which in turn is fed to the battery 9.

An HEV controller 14 is coupled to the engine controller 15, a motor controller 11 and a battery controller 12 through the medium of a communication means such as CAN (Controller Area Network) and acts as a controller which performs control for an HEV system by, for example, calculating torque commands to the AC motor 4 on the basis of vehicle information and states of individual parts.

The battery controller 12 calculates such parameters as charge state, current limit value, power limit value, temperature and lifetime of the battery 9. On the basis of a torque command value to AC motor 4 obtained from the master HEV controller 14, the motor controller 11 determines an AC voltage to be applied from the inverter and delivers a voltage command (voltage pulse) to the inverter 8.

Turning now to FIG. 1, how a system of motor control operated by the motor controller 11 is configured in the present embodiment will be described. Typically, a torque command is inputted to the motor control system (an upper speed control system will sometimes be incorporated) and a three-phase voltage command to the motor is so operated as to cause an actual current of the motor to follow a motor current command. Vector control has hitherto been applied to control of the AC motor and generally, a current control system on d-q coordinates is set up. In the d-q axis coordinate system, d-axis represents the direction of magnetic pole position (magnetic flux) and q-axis represents the direction electrically orthogonal to the d-axis.

In FIG. 1, a current command calculation unit 20 calculates a d-axis current command Id* and a q-axis current command Iq* for a synchronous motor on the basis of a torque command Tr* and a motor revolving speed Wm. For example, an Id and Iq table corresponding to individual operating points of torque command Tr* and motor revolving speed number Wm is held internally and Id* and Iq* command values are determined at each operating point. A voltage command calculation unit 21 operates a d-axis current difference from the d-axis current command Id* calculated by the current command calculation unit 20 and a d-axis current Id and also operates a q-axis current difference from the q-axis current command Iq* calculated by the current operation unit 20 and a q-axis current Iq and for the respective differences, calculates a d-axis voltage command Vd* and a q-axis voltage command Vq* through PI control process.

A three-phase voltage command calculation unit 22 performs coordinate transform for the d-axis voltage command Vd* and q-axis voltage command Vq* calculated by the voltage command calculation unit 21 by using a corrected magnetic pole position θe, thus calculating AC voltage commands Vu*, Vv* and Vw* for the AC motor 4. A signal processing unit 23 generates, on the basis of the AC voltage commands Vu*, Vv* and Vw* calculated by the three-phase voltage command calculation unit 22, signals for driving switching elements inside the inverter 8 in order that the inverter can be controlled in various drive modes (for example, in PWM control or rectangular wave control) and delivers the drive signals to the inverter 8.

The magnetic pole position and revolving angle of AC motor 4 are detected with a resolver 25 and the motor current is detected with the current sensor and these detected values are sent to the motor controller 11. U-phase current Iu and V-phase current Iv detected by means of the current sensor are converted into a d-axis current Id and a q-axis current Iq on the d-q axis coordinate system, respectively, by means of the coordinate transform unit 24. Since a W-phase current Iw can be calculated from the U-phase and V-phase currents Iu and Iv, detection of the W-phase current Iw is omitted in the present embodiment.

For the magnetic pole position detected by the resolver 25 provided for the AC motor 4, a magnetic pole position correction unit 26 estimates an error in position by using a method to be described later so that the magnetic pole position may be corrected and outputted. For the coordinate transform in the three-phase voltage command calculation unit 22 and coordinate transform unit 24, the magnetic pole position corrected by means of the magnetic pole position correction unit 26 is used.

The DC voltage of battery 9 is converted by means of the inverter 8 into a three-phase AC voltage which in turn is applied to the AC motor 4. This application voltage is subjected to the previously described operation in advance so as to determine a voltage to be applied to the inverter 8.

In the event that an error develops in the magnetic pole position of the motor used for driving the hybrid vehicle, not only an error occurs in the output torque of the motor but also the battery is sometimes influenced. Especially, in the hybrid vehicle constructed in the type of direct connection of the engine and motor, the vehicle runs with the engine in a high-speed region and so the frequency of making the torque command to the motor null is relatively high and if this condition continues, unwanted power running torque or regenerative torque will be generated under the influence of the error in magnetic pole position even if the torque command value is made to be zero. As a result, quite an unexpected current is passed through the battery and if, for example, the battery has already been charged almost fully, the battery will be so overcharged that it suffers an adverse influence leading to a failure.

Under the circumstances, with the aim of preventing the battery from being adversely affected by the error in magnetic pole position of the motor, the detection values of currents flowing into and out of the battery are utilized in the present invention. The construction of the magnetic pole position correction unit 26 and a process flow therein will be described next with reference to FIGS. 3 and 4.

Figure 3:
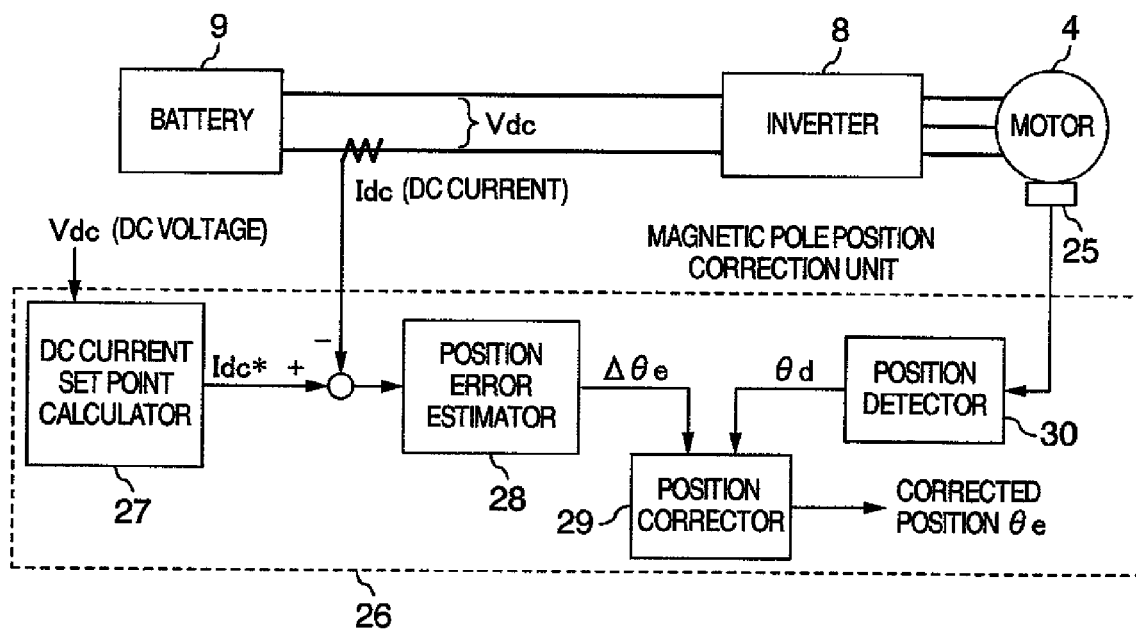
FIG. 3 is a block diagram showing a magnetic pole position correction unit used in the motor control.

Illustrated in FIG. 3 are details of construction of the magnetic pole position correction unit 26. The magnetic pole position correction unit 26 includes a DC current set point calculator 27 for calculating a set point Idc* of DC current, a position error estimator 28 for estimating an error in position, a position detector 30 for operating a phase from an output of the resolver 25 and a position corrector 29 for correcting the magnetic pole position by using these calculated values.

In the DC current set point calculator 27, the set point Idc* of DC current is so set as to cause a desired current to flow to the battery. For example, in the case of the vehicle construction as in the present embodiment, with charging kept continued when the torque command value to the motor 4 is zero, the battery is overcharged depending on its condition and will possibly suffer a failure. To prevent this problem, an Idc* effective for such control that unwanted current does not flow into the battery is determined. Here, an example is shown in which the set point Idc* of DC current is set to 0. The way this set point Idc* is determined will be described later.

In the position error estimator 28, a difference (Idc*−Idc) between the set point Idc* of DC current calculated by the DC current set point calculator 27 and a DC current Idc of battery detected by the current sensor is calculated and a position error Δθe is estimated through PI control.

A detection value θd of magnetic pole is operated in the position detector 30 and in respect of the detection value θd of magnetic pole operated by the position detector 30, the magnetic pole position is corrected pursuant to the following equation by using the position error Δθe operated by the position error estimator 28.

$$\theta e = \theta d + \Delta\theta e \quad (1)$$

The magnetic pole position θe after correction calculated pursuant to equation (1) is delivered out of the magnetic pole position correction unit 26 and is used in the three-phase voltage command calculation unit 22 and coordinate transform unit 24 shown in FIG. 1.

Figure 4:
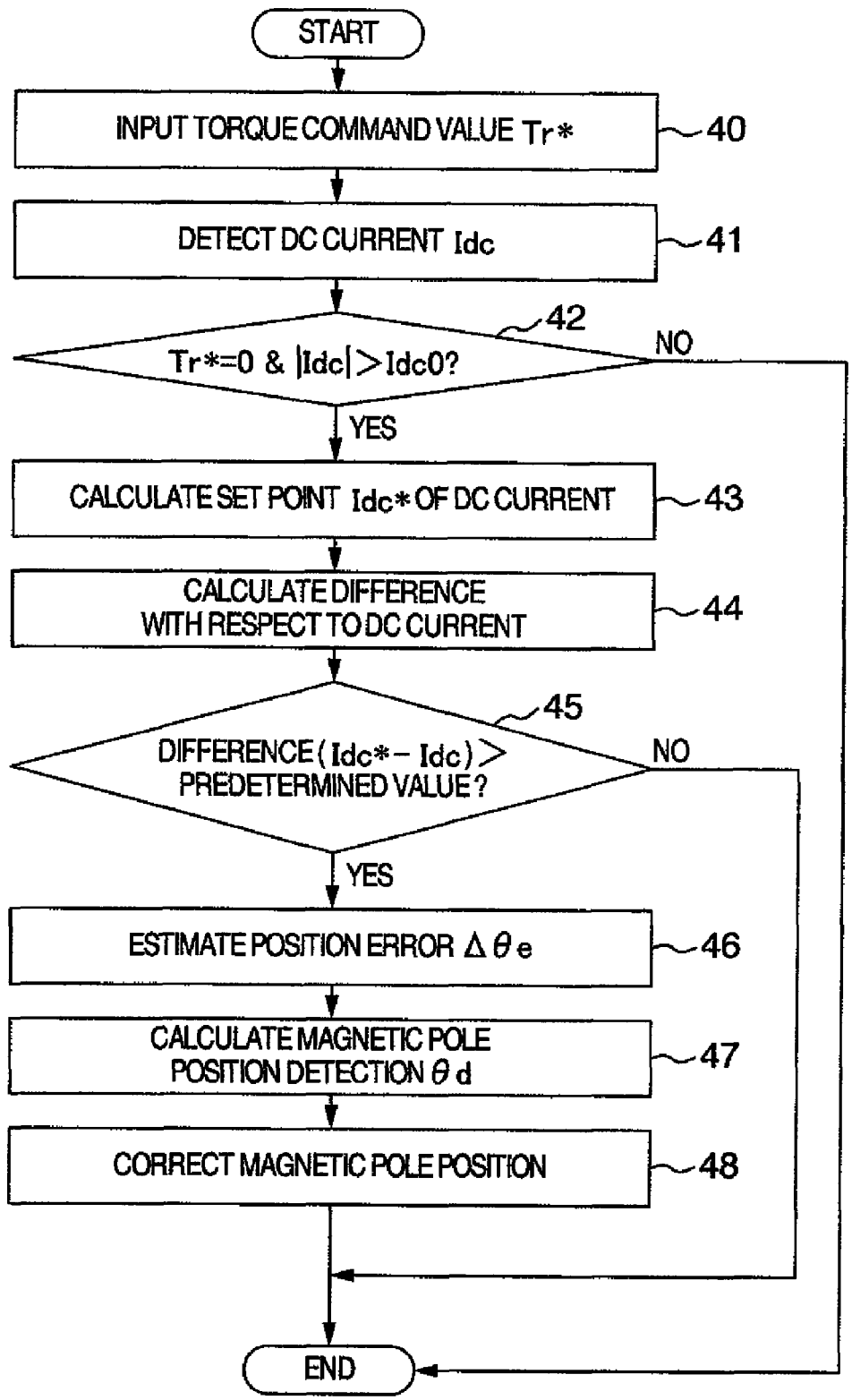
FIG. 4 is a flowchart showing processes indicative of an example of a method of correcting the magnetic pole position in the motor controller.

Referring to FIG. 4, a flowchart is illustrated for explaining the logic in the magnetic pole position correction. In the present embodiment, an example is shown in which when the torque command value to the motor 4 is zero, the set point Idc* of DC current is set to 0. Conveniently, this takes into account the fact that when charging is kept continued with the torque command value to the motor 4 being zero in the vehicle construction as in the present embodiment, for example, the battery will be overcharged depending on its condition and will possibly suffer a failure.

Firstly, in step 40, a torque command value is inputted. Next, in step 41, a DC current Idc of the battery (inverter) is detected by means of the current sensor. In step 42, in order to decide whether the position correction is to be carried out, it is detected that the torque command value is zero and the current is passed through the battery. When torque command value Tr*=0 and DC current |Idc|>Idc0 are determined (Idc0 being a given value and for example, Idc0≈0 being held) in the step 42, the program proceeds to step 43 and ensuing steps to carry out a process for estimation of the position error. Especially, since in the present embodiment the battery current is desired to be prevented from being passed through in the charging direction, conditions of Tr*=0, |Idc|>Idc0 and Idc<0 may be set. If the conditions in the step 42 are not satisfied, the position error correction is not practiced and the process ends.

Next, in the step 43, the set point Idc* of DC current is so set as to cause a desired current to pass through the battery. As described previously, an Idc* effective for such control that unwanted current is prevented from being passed through to the battery is determined in the present embodiment. Therefore, an example of setting of DC current set point Idc*=0 is shown herein. How to determine the set point Idc* will be described later.

The program proceeds to step 44 where a difference (Idc*−Idc) between the set point Idc* of DC current calculated in the step 43 and the DC current Idc of battery detected with the current sensor is calculated. In step 45, if the difference determined in the step 44 is larger than a predetermined value, it is determined that the magnetic pole position deviates and the program proceeds to step 46 and ensuing steps. In the step 46, a position error Δθe is estimated through PI control.

Next, in step 47, a detection value θd of magnetic pole position is operated, proceeding to step 48. In the step 48, with respect to the detection value θd of magnetic pole position generated in the step 47, the magnetic pole position is corrected pursuant to equation (1) by using the position error Δθe operated in the step 46.

If in the step 45 the difference in DC current is within the predetermined value, update of the magnetic pole position ends.

In the foregoing embodiment, the example is shown wherein when the torque command value to the motor is zero, setting to the set point Idc*=0 of DC current is established and according to this method, the battery can be prevented from being charged by the motor due to cooperative rotation of the motor during running by the engine only. Consequently, generation of unwanted regenerative torque can be avoided and the battery can be prevented from being charged, ensuring that the loss can be reduced and the battery can be protected.

In the method described as above, the position error in the resolver 25 is not eliminated completely and for correction of the position error per se, an operation as below is needed.

Thus, in connection with the DC current set point calculator 27, a method of setting the Idc* to a given value when the torque command value is zero will be described with reference to FIGS. 5 to 8.

Figure 5:
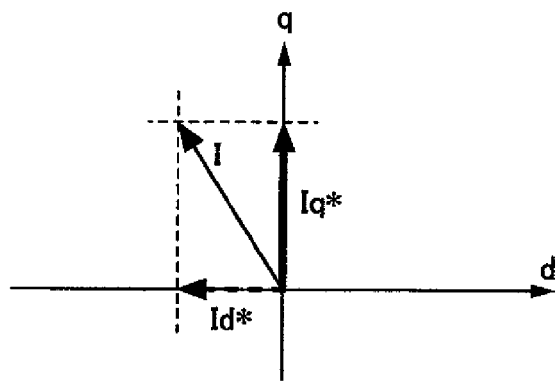
FIG. 5 is a graph showing the relation between current command values on d-q coordinate axes.

Firstly, d-axis current command Id* and q-axis current command Iq* to be calculated in the current command calculation unit 20 when the torque command value Tr* to the AC motor 4 is zero will be described. In FIG. 5, a d-q axis coordinate system is illustrated where d-axis represents the direction of the magnetic pole position (magnetic flux) and q-axis represents the direction electrically orthogonal to the d-axis. As shown in FIG. 5, a motor current I can be decomposed into d-axis and q-axis components where a current component related to torque is the q-axis current Iq but the component of d-axis current Id is not used for working out a torque output of the motor and is consumed in the form of a loss.

It will now be appreciated that the motor for driving the hybrid vehicle is often used at a low speed and at a large torque and even at a high speed, is used at a constant output. During low speed running, a large torque can be outputted but during high speed running, the induced voltage becomes high and no current flows to thereby reduce the torque, so that weak field control is carried out to perform control such that even when the torque command value Tr* to the motor is zero, the d-axis current Id is passed through even in a high revolution region.

Figure 7:
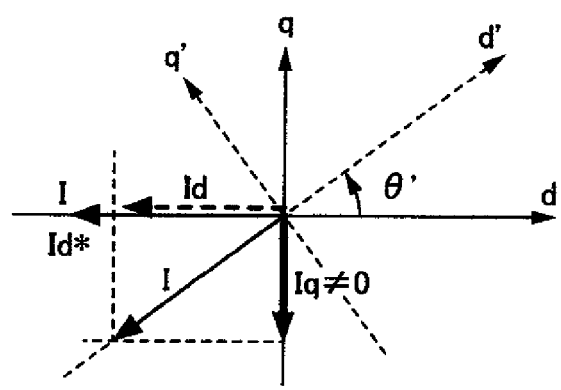
FIG. 7 is a graph showing an influence an error in magnetic pole position has upon the current command values on d-q coordinate axes.

Accordingly, at the operating point as above, only the d-axis current command Id* is given and the q-axis current command Iq* is commanded as being zero. In this case, even with the d-axis current passed through, no q-axis current is passed through and it will essentially be expected that the motor does not generate drive running torque and regenerative torque and that no current input/output to/from the battery 9 occurs. But, when the magnetic pole position value of the motor deviates, current values different from the command values flow on the d-axis and q-axis as shown in FIG. 7. As a result, a torque corresponding to the current Iq flowing on the q-axis (in this case, because of minus direction, a regenerative torque) is generated and current flows into the battery to charge it.

Figure 6:
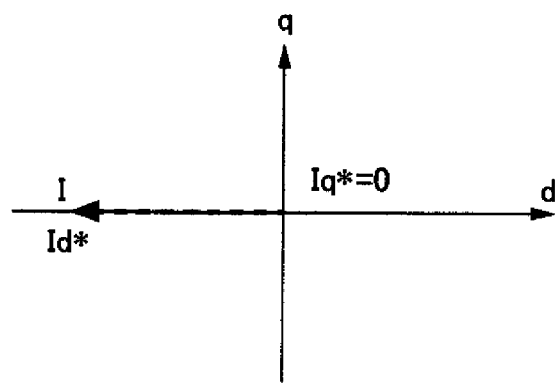
FIG. 6 is a graph showing current command values on d-q coordinate axes when the torque command value is zero.
Figure 8:
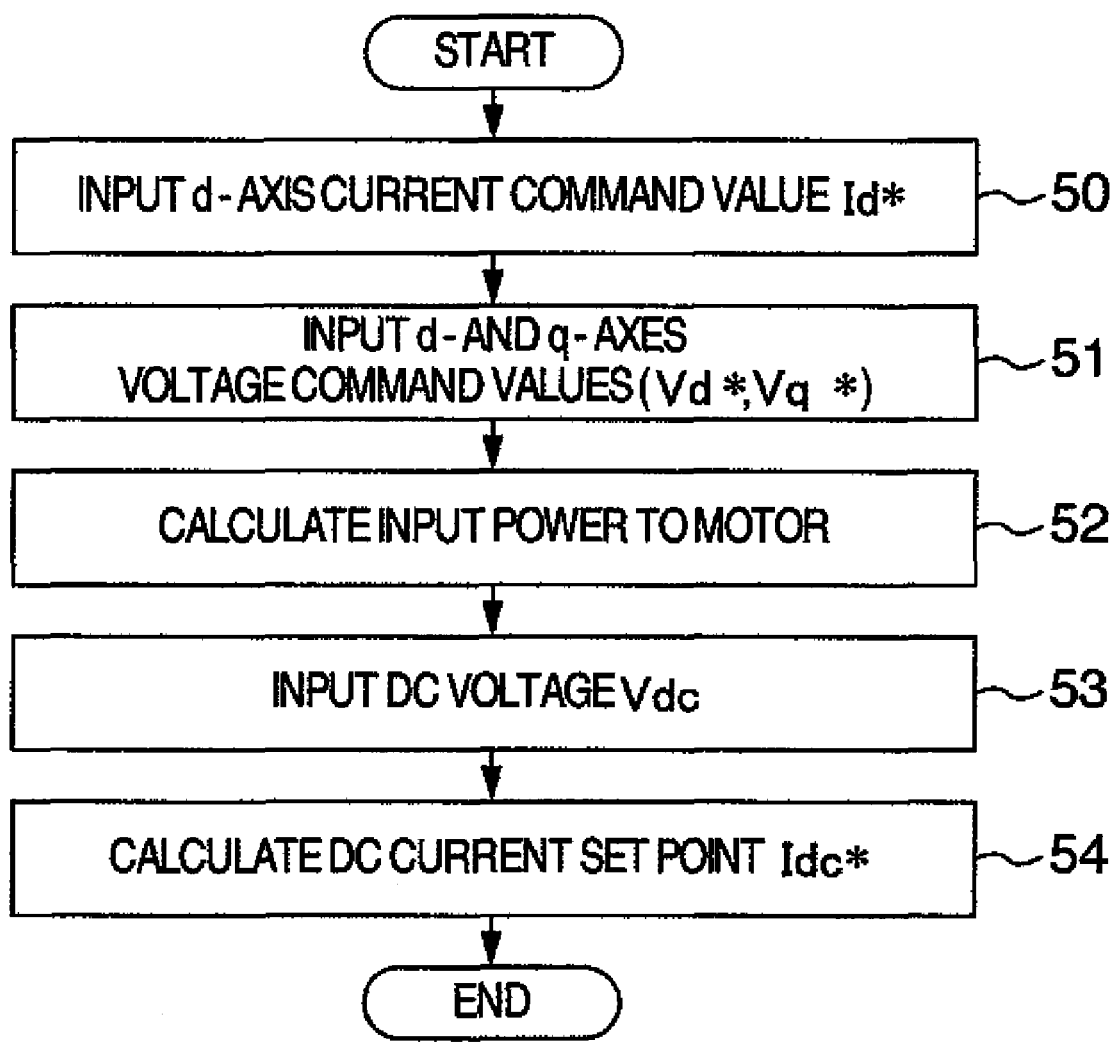
FIG. 8 is a flowchart showing processes indicative of an example of calculation of a DC current set point.

In the present embodiment, the method is adopted to correct the position error by detecting a current value not to be passed through as DC current. In FIG. 6, a d-axis current command value (Id*) component is a current to be consumed by the motor by itself and therefore, a set point Idc* may be determined such that a DC component current corresponding to the d-axis current command Id* should be taken out of the battery. Then, in the DC current set point calculator 27, the set point Idc* of input/output current to/from the battery 9 is determined on the basis of a process flow as shown in FIG. 8. In the present embodiment, a method for conversion to DC current by dividing the input power to motor 4 by DC voltage will be described.

Firstly, in step 50 in FIG. 8, a d-axis current command value Id* is inputted. Next, in step 51, d-axis voltage command value Vd* and q-axis voltage command value Vq* which are calculated in the voltage command calculation unit 21 in FIG. 1 are inputted. Thereafter, in step 52, an input power of the motor 4 is calculated from the current command value and voltage command value on the d-q coordinate axis which are inputted in the steps 50 and 51, respectively, pursuant to the following equation:

$$Pm = Id^* \cdot Vd^* + Iq^* \cdot Vq^* \quad (2)$$

Subsequently, in step 53, a DC voltage Vdc is inputted and in step 54, a set point Idc* of DC current is calculated pursuant to the following equation (3):

$$Idc^* = Pm/Vdc \quad (3)$$

By using the thus determined set point Idc* of DC current as a command value and a difference from the DC current Idc in FIG. 3, the position error can be compensated.

For calculation of the set point Idc* of Dc current, the calculation is carried out in the foregoing each time the conversion to power is carried out but Idc*'s corresponding to Id*'s may be held in the form of a map.

Through the foregoing method, not only the battery 9 is protected but also the position error per se in the resolver 25 can be corrected. Accordingly, even in the event that the resolver (revolution sensor) deviates owing to aging deterioration, the position error can be corrected during running of the vehicle. In addition, the man-hour for work of mounting the resolver 25 can be reduced.

Figure 9:
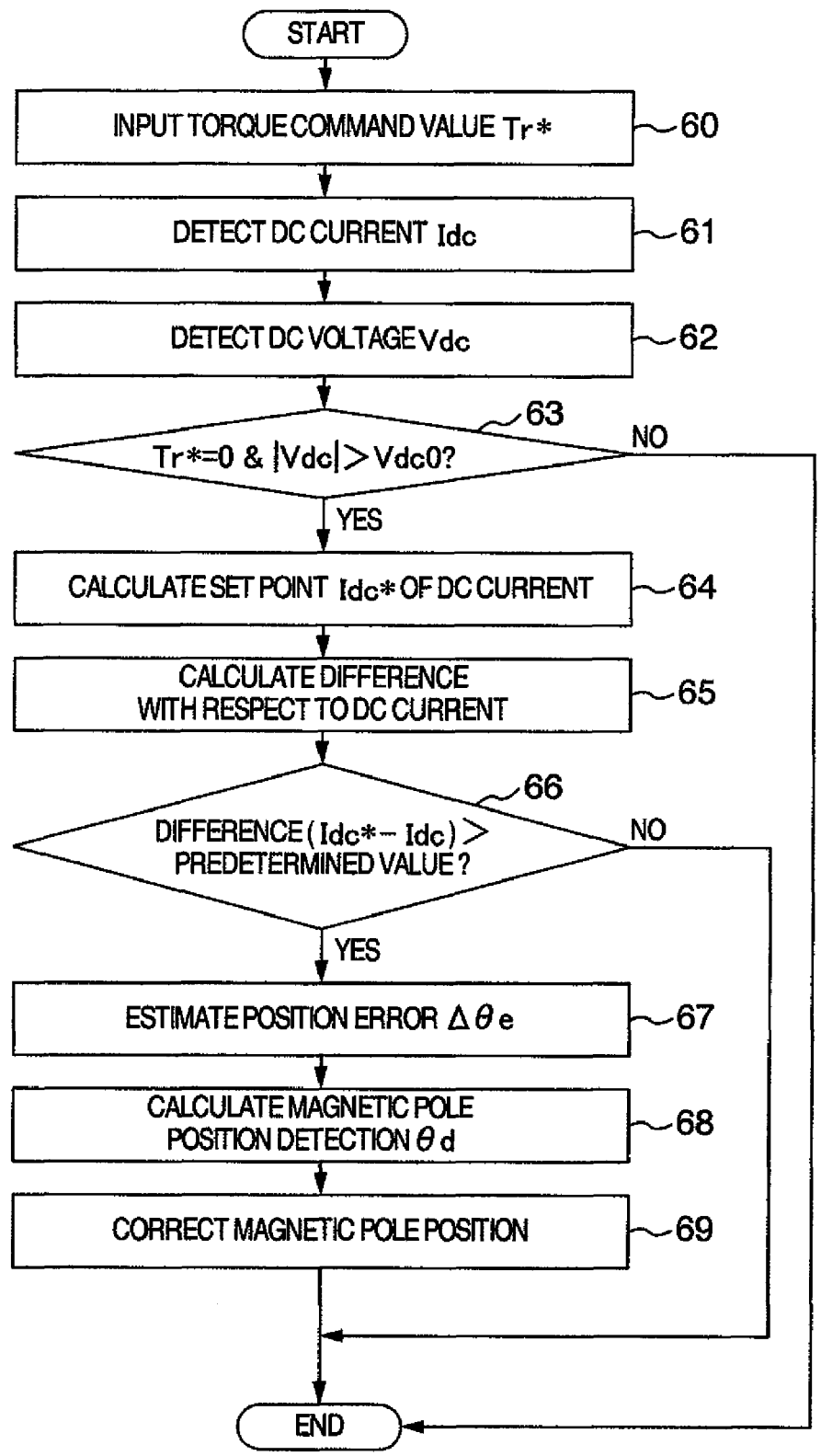
FIG. 9 is a flowchart showing processes indicative of an example of a method for correction of magnetic pole position in the motor controller according to a second embodiment of the invention.

Turning now to FIG. 9, a second embodiment of the present invention will be described.

According to the present embodiment, in the magnetic pole position correction unit 26, the presence or absence of a magnetic pole position error is decided by utilizing a detection value of battery voltage Vdc and the position error is corrected as will be explained with reference to a flowchart of FIG. 9.

Illustrated in the flowchart of FIG. 9 are processes of logics of magnetic pole position correction operated by the motor controller 11. In the present embodiment, an example is shown in which when the torque command to the motor 4 is zero, setting to the set point Idc*=0 of DC current is established.

Firstly, in step 60, a torque command value is inputted. Next, in step 61, a DC current Idc of the battery 9 is detected by means of the current sensor and in step 62, a battery DC voltage Vdc is inputted. In step 63, in order to decide whether the position correction is to be carried out, it is detected that the torque command value is zero and a detection is made as to whether the voltage of battery 9 varies in excess of a predetermined value. When torque command value Tr*=0 and a variation width of DC voltage |ΔVdc|>Vdc0 within a predetermined time are determined (Vdc0 being a given value and for example, ΔVdc0≈0 being held), the program proceeds to step 64 and ensuing steps to carry out a process for estimation of the position error. Especially, since in the present embodiment the battery 9 is desired to be prevented from being charged, conditions of Tr*=0, |ΔVdc|>Vdc0 and ΔVdc>0 (increase) may be set. If the conditions in the step 63 are not satisfied, the position error correction is not carried out and the process ends.

Next, in the step 64, the set point Idc* of DC current is so set as to cause a desired current to pass through the battery 9. As described previously, an Idc* effective for such control that unwanted current is prevented from being passed through to the battery 9 is determined in the present embodiment. Therefore, an example of setting of DC current set point Idc*=0 is shown. The manner of determining the set point Idc* has already been described.

The program proceeds to step 65 where a difference (Idc*−Idc) between the set point Idc* of DC current calculated in the step 64 and the DC current Idc of battery 9 detected with the current sensor is calculated. In step 66, if the difference determined in the step 65 is larger than a predetermined value, it is determined that the magnetic pole position deviates and the program proceeds to step 67 and ensuing steps. In the step 67, a position error Δθe is estimated through PI control.

Next, in step 68, a detection value θd of magnetic pole position is operated, proceeding to step 69. In the step 69, with respect to the detection value θd of magnetic pole position operated in the step 68, the magnetic pole position is corrected pursuant to equation (1) by using the position error Δθe operated in the step 67.

If in the step 66 the difference in DC current is within the predetermined value, update of the magnetic pole position ends.

In this manner, by detecting the DC voltage Vdc and calculating its time-dependent variation, the presence or absence of a position error can be decided and the position error can be compensated as in the case of embodiment 1.

The example of performing position correction after shipment of the motor or inverter has been described with the construction explained in connection with embodiments 1 and 2 but a method can be employed in which in the phase of shipment, a process of practicing the position correction may be added in order to perform the position correction in advance.

Next, by using FIGS. 10 and 11, a third embodiment of the invention will be described.

When an error develops in magnetic pole position of the motor used for driving the hybrid vehicle, an error occurs in output torque of the motor and an unnecessary torque is delivered, having an influence even upon the rate of fuel consumption in some case. Especially, in the hybrid vehicle constructed in the type of direct connection of the engine and motor as in the present embodiment, the vehicle runs with the engine in a high-speed region and so the frequency of zeroing the torque command to the motor is relatively high and if the erroneous condition continues, unwanted power running torque or regenerative torque will be delivered under the influence of the error in magnetic pole position even if the torque command value is made to be zero. As a result, the battery will undergo unnecessary charge or discharge, thus degrading the rate of fuel consumption.

Then, a fault diagnosis unit is provided for the vehicle in order that the driver can be informed of an adverse influence upon the rate of fuel consumption of the vehicle the magnetic pole position error of motor has. In the present invention, a fault diagnosis process will be described by making reference to FIGS. 10 and 11. Like reference numeral designates like component in the foregoing embodiment unless a reference contrary to this effect is given.

Figure 10:
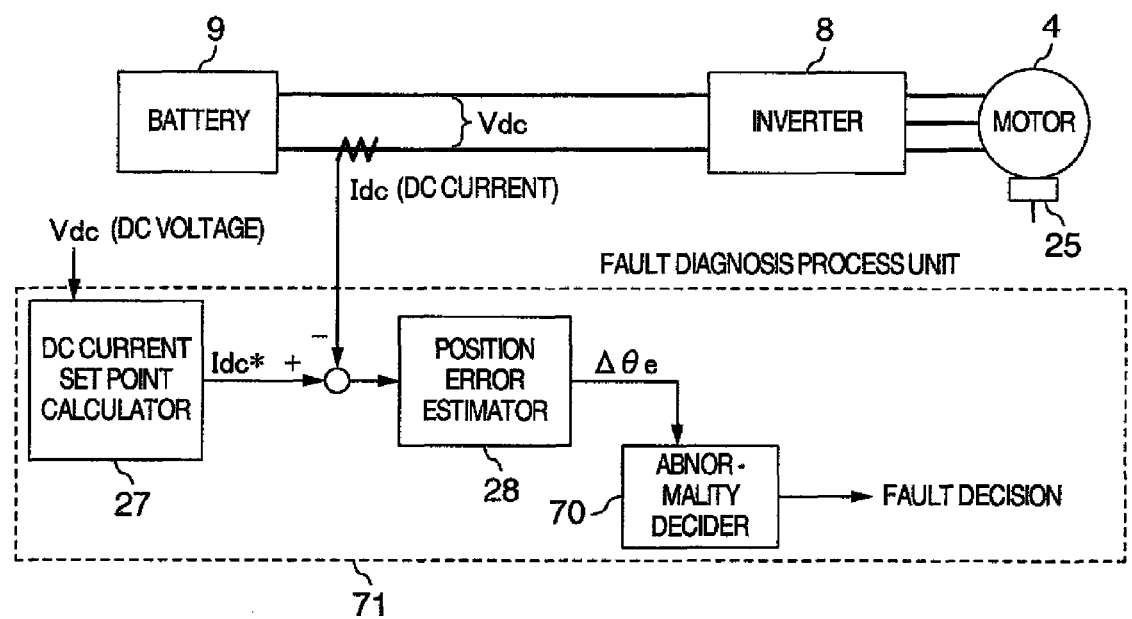
FIG. 10 is a diagram showing control blocks in a fault diagnosis unit a third embodiment of the invention.

Details of construction of a fault diagnosis process unit 71 are illustrated in FIG. 10. The fault diagnosis process unit 71 includes a DC current set point calculator 27 for calculating a set point Idc* of DC current, a position error estimator 28 for estimating a position error and an abnormality decider 70 for deciding an influence upon the rate of fuel consumption the phase error has in order to detect an abnormality.

In the DC current set point calculator 27, a set point Idc* of DC current is so set as to cause a desired current to pass through the battery. For example, in the case of the vehicle construction as in the present embodiment, with charging kept continued when the torque command value to motor 4 is zero, the battery is overcharged depending on its condition and will possibly suffer a failure. To prevent this problem, an Idc* effective for such control that unwanted current is prevented from being passed through to the battery is determined in the present embodiment. Here, an example is shown in which the set point Idc* of DC current is set to 0. The way this set point Idc* is determined will be described later.

In the position error estimator 28, a difference (Idc*−Idc) between the set point Idc* of DC current calculated by the DC current set point calculator 27 and the DC current Idc of battery detected by the current sensor is calculated and a position error Δθe is estimated through PI control.

By using the position error Δθe operated by the position error estimator 28, the abnormality decider 70 decides whether the position error influences the rate of fuel consumption and if so, delivers a fault decision output. The result of decision is delivered out of the fault diagnosis process unit 71, informing the driver of this effect through a display panel (not shown) provided internally of the vehicle. The driver is notified of information purporting that the rate of fuel consumption degrades or an error develops in the magnetic pole position sensor of the motor.

Figure 11:
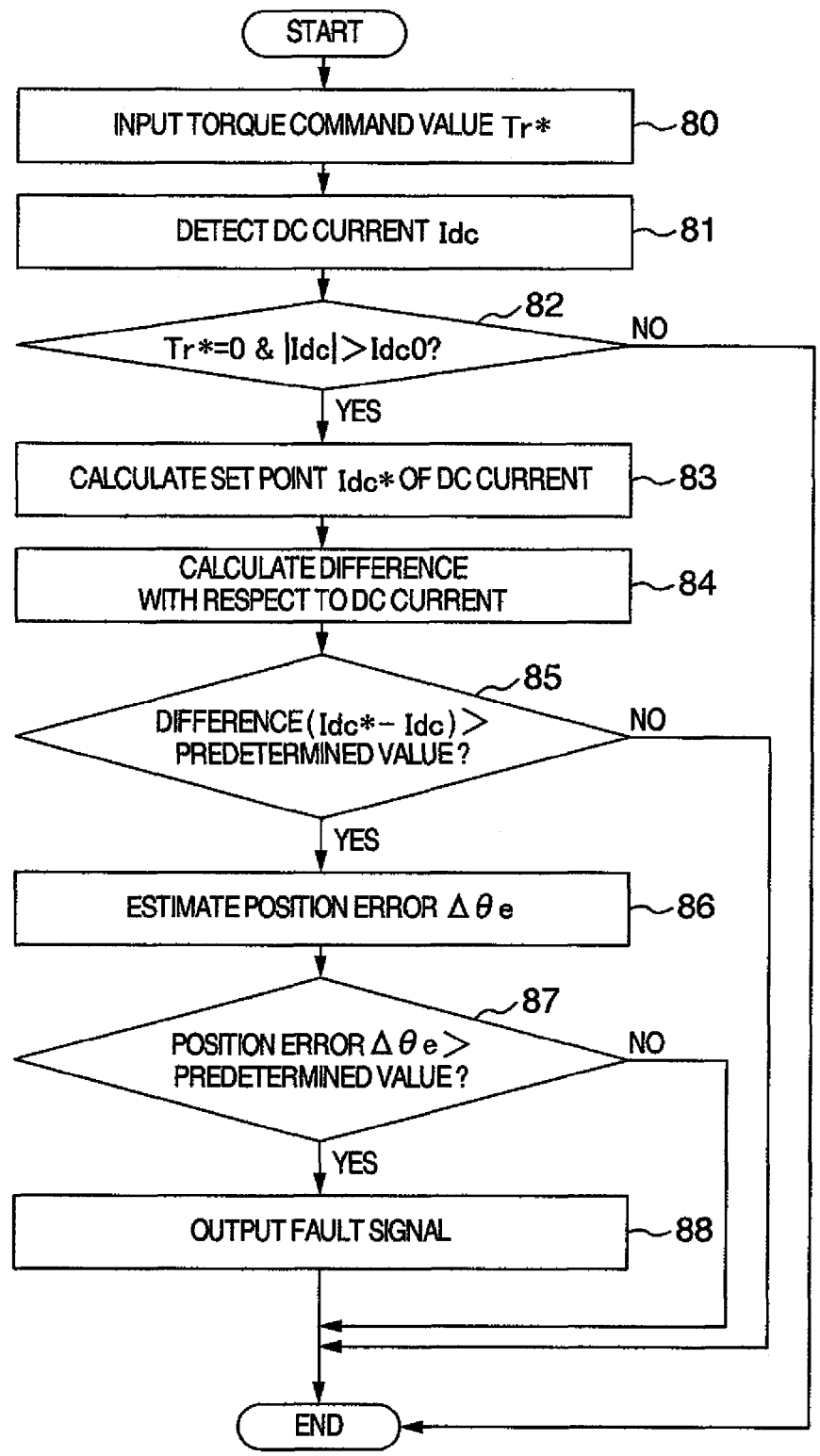
FIG. 11 is a flowchart showing processes indicative of an example of fault diagnosis in the invention.

Referring to FIG. 11, a flowchart is illustrated for explaining an example of logics in the fault decision affecting the rate of fuel consumption which are operated by the fault diagnosis process unit 71.

In the present embodiment, the example is shown in which when the torque command value to the motor 4 is zero, setting of the set point Idc*=0 of DC current is established. Conveniently, this takes into account the fact that with discharging kept continued when the torque command value to the motor 4 is zero in the vehicle construction as in the present embodiment, for example, the battery will keep discharging unnecessary power and the rate of fuel consumption will possibly be degraded.

Firstly, in step 80, a torque command value is inputted. Next, in step 81, a DC current Idc of the battery (inverter) is detected by means of the current sensor. In step 82, in order to decide a fault due to a position error, it is detected that the torque command value is zero and current is passed through the battery. When torque command value Tr*=0 and DC current |Idc|>Idc0 are determined (Idc0 being a given value and for example, Idc0≈0 being held), the program proceeds to step 83 and ensuing steps to carry out a process for estimation of the position error. Especially, since in the present embodiment the battery current is desired to be prevented from being passed through in the discharging direction, conditions of Tr*=0, |Idc|>Idc0 and Idc>0 may be set. If the conditions in the step 82 are not satisfied, the fault decision process is not conducted and the process ends.

Next, in the step 83, the set point Idc* of DC current is so set as to cause a desired current to pass through the battery. As described previously, an Idc* effective for such control that unnecessary current is prevented from being brought out of the battery is determined in the present embodiment. Therefore, an example of setting of DC current set point Idc*=0 is shown here.

The program proceeds to step 84 where a difference (Idc*−Idc) between the set point Idc* of DC current calculated in the step 83 and the DC current Idc of battery detected with the current sensor is calculated. In step 85, if the difference determined in the step 84 is larger than a predetermined value, it is determined that the magnetic pole position deviates and the program proceeds to step 86 and ensuing steps. In the step 86, a position error Δθe is estimated through PI control.

Next, in step 87, it is decided whether the position error Δθe calculated in the step 86 has a large adverse influence upon the rate of fuel consumption. When the position error |Δθe|>Δθe0 (Δθe0 being a predetermined value and for example, Δθe0=10 deg) stands, the program proceeds to step 88 where a fault signal is outputted. The thus outputted fault signal is informed to the user (driver) as information purporting that the magnetic pole position sensor for the motor deviates or that the rate of fuel consumption is degraded by using, for example, the display unit mounted internally of the vehicle.

According to the above embodiment, in the fault diagnosis unit for diagnosing faults in individual components of the vehicle, the present method can be used as a method of deciding one of items responsible for degrading the rate of fuel consumption. Further, in accordance with the degree of influence the position error of the motor has, the present method can be used to inform a fault diagnosis result to the effect that the error in the magnetic pole position sensor is large.

The motor controller of the present invention has been described as being applied to the controller for controlling the motor used in the hybrid vehicle but may also be applicable to general industrial equipments each using a motor.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A motor controller having an AC motor, a revolution sensor for detecting a position of a magnetic pole of said AC motor, an inverter for driving said AC motor and control means for controlling said inverter in accordance with a requested torque, comprising:
    magnetic pole position correction means for correcting, by using a DC current for said inverter, the magnetic pole position of said motor detected by means of said revolution sensor;
    wherein said magnetic pole position correction means includes DC current set point calculation means for calculating a set point of DC current for said inverter when the torque command value to said motor is zero; and
    wherein the detected inverter DC current is compared with the set point calculated by said DC current set point calculation means to estimate an error in the magnetic pole position of said motor, thereby correcting the magnetic pole position.

2. The motor controller according to claim 1, wherein said DC current set point calculation means calculates the set point of DC current by using a current command value to said motor when the torque command value to said motor is zero.

3. A motor controller having an AC motor, a revolution sensor for detecting a position of a magnetic pole of said AC motor, an inverter for driving said AC motor, a battery for inputting or outputting power with respect to said inverter, and control means for controlling said inverter in accordance with a requested torque,
    wherein the presence or absence of an error in the magnetic pole position of said motor is decided by detecting a variation in voltage of said battery when the torque command value to said motor is zero,
    further comprising DC current set point calculation means for calculating a set point of the DC current for said inverter when the torque command value to said motor is zero,
    wherein the detected inverter DC current is compared with the set point calculated by said DC current set point calculation means to estimate an error in the magnetic pole position of said motor, thereby correcting the magnetic pole position.

4. A motor controller having an AC motor, a revolution sensor for detecting a position of a magnetic pole of said AC motor, an inverter for driving said AC motor, a battery for inputting or outputting power with respect to said inverter, and control means for controlling said inverter in accordance with a requested torque,
    wherein the presence or absence of an error in the magnetic pole position of said motor is decided by detecting a variation in voltage of said battery when the torque command value to said motor is zero, and
    wherein said DC current set point calculation means calculates the set point of DC current by using the current command value to said motor when the torque command value to said motor is zero.

5. A motor controller having an AC motor, a revolution sensor for detecting a position of a magnetic pole of said AC motor, an inverter for driving said AC motor, a battery for inputting or outputting power with respect to said inverter, and control means for controlling said inverter in accordance with a requested torque,
    wherein the presence or absence of an error in the magnetic pole position of said motor is decided by detecting a variation in voltage of said battery when the torque command value to said motor is zero, and
    wherein said DC current set point calculation means calculates the set point of DC current by using the current command value to said motor when the torque command value to said motor is zero.

6. A motor controller having an AC motor, a revolution sensor for detecting a position of a magnetic pole of said AC motor, an inverter for driving said AC motor, a battery for inputting or outputting power with respect to said inverter, and control means for controlling said inverter,
    wherein position error estimation means is provided which estimates an error in the motor magnetic pole position by detecting a variation in power of said battery when the torque command value to said motor is a predetermined value, and wherein a faulty state is decided from the error estimated by said position error estimation means.

7. The motor controller according to claim 6, further comprising DC current set point calculation means for calculating a set point of the DC current for said inverter when the torque command value to said motor is zero, wherein said position error estimation means compares the detected inverter DC current with the set point calculated by said DC current set point calculation means to estimate an error in the magnetic pole position of said motor.

8. A motor controller according to claim 7, wherein said DC current set point calculation means calculates the set point of DC current by using a command value to said motor when the torque command value to said motor is zero.

* * * * *